US006650289B2

(12) United States Patent
Levy et al.

(10) Patent No.: US 6,650,289 B2
(45) Date of Patent: Nov. 18, 2003

(54) POINT TO POINT COMMUNICATION SYSTEM WITH PARALLEL LINKS

(75) Inventors: Shmuel Levy, Q. Tivon (IL); Noam Livneh, M.P. Misgave (IL); Ori Stern, Kiryat Bialik (IL); Ami Saguy, Kiryat Motzkin (IL)

(73) Assignee: Microwave Networks Incorporated, Stafford, TX (US)

( * ) Notice: Subject to any disclaimer, the term of this patent is extended or adjusted under 35 U.S.C. 154(b) by 0 days.

(21) Appl. No.: 09/956,024

(22) Filed: Sep. 20, 2001

(65) Prior Publication Data

US 2002/0060643 A1 May 23, 2002

Related U.S. Application Data

(60) Provisional application No. 60/234,232, filed on Sep. 21, 2000.

(51) Int. Cl.$^7$ ................. H04B 7/00; H04J 3/00
(52) U.S. Cl. ................. 342/367; 370/345
(58) Field of Search ................. 342/367; 370/342, 370/345; 455/101, 103; 375/261, 398, 350

(56) References Cited

U.S. PATENT DOCUMENTS

| | | | | |
|---|---|---|---|---|
| 6,058,105 A | * | 5/2000 | Hochwald et al. | 370/310 |
| 6,115,427 A | | 9/2000 | Calderbank et al. | |
| 6,127,971 A | | 10/2000 | Calderbank et al. | |
| 6,178,196 B1 | | 1/2001 | Naguib et al. | |
| 6,185,258 B1 | | 2/2001 | Alamouti et al. | |
| 6,188,736 B1 | | 2/2001 | Lo et al. | |

OTHER PUBLICATIONS

Beva, D.D.N. et al, "Space Time Coding for Capacity Enhancement in Future Generation Wireless Communications Networks,"IEE Colloq on Capacity and Range Enhancement Tech for 3$^{rd}$ Gen. Mob.Comm. and Beyond, Feb. 2000,p. 8/1–11.*

Sampath, Hemanth et al, "Joint Transmit and REceive Optimization for High Data Rate Wireless Communication Using Multiple Antennas,"Conf. Rec. of the 33$^{rd}$ ASILO-MAR Conf on Signals,Systems,and Computers, Oct. 1999, p. 215–219 v1.*

"Channel Capacity of Two Antenna BLAST Architecture", S.L. Lokya, Electronics Letters, Aug. 19, 1999, vol. 35 No. 17.

"Increasing Data Rate Over Wireless Channels" by A.F. Naguib, N. Seshadri and A.R. Calderbank. IEEE Signal Processing Magazine, May 2000, pp. 77–92.

"Antenna Engineering Handbook", R.C. Johnson, Chapter 20, pp. 20–25, McGraw Hill. ISBN 0–07–032381.

"Modern Digital and Analog Communication Systems" by B.P. Lathi, 2$^{nd}$ Edition (Hold, Rinehart and Winston, Inc.), 1989, p. 11 (equation 1.2).

Digital Communications, John G. Proakis, 3$^{rd}$ edition, 1995, pp. 380–387.

* cited by examiner

*Primary Examiner*—Gregory C. Issing
(74) *Attorney, Agent, or Firm*—Oliff & Berridge PLC

(57) ABSTRACT

Methods and systems for increasing the potential capacity of point to point communication between two sites within line of sight of each other are disclosed. Two antennas at each of the two sites are configured geometrically to approximately provide a desired value for a function of signal electrical phase differences so as to allow differentiation of transmitted signal. Capacity is thereby increased compared to a system with one antenna at each site.

39 Claims, 7 Drawing Sheets

POINT TO POINT COMMUNICATION SYSTEM WITH PARALLEL LINKS

BACKGROUND OF THE INVENTION

1. Field of Invention

The present invention relates to point to point wireless data links.

2. Description of Related Art

FIG. 1 shows a block diagram of a prior art system 110 at a site linked to another site by a single point to point wireless data link. In operation in the transmit mode, a data port 112 is connected to a protocol engine 114 to generate the link data stream. Protocol engine 114 adds link management overhead and re-organizes the frame. A coding unit 116 adds redundancy to the data for the purpose of forward error correction. A modulator 118 translates the bits streams to quadrature amplitude modulation (QAM) symbols (mapping). A transmitter 122 up-converts the symbols to high frequency from IF/baseband frequency. In operation in the receive mode, the symbols received are down-converted by receiver 124 to IF/baseband frequency. A demodulator 120 translates the symbols into bit streams. Decoding unit 116 removes redundant data for forward error correction. Protocol engine 114 removes overhead and recovers the original frames. The data stream is outputted through data port 112. A duplexer or T/R switch 126 allows frequency division duplex (FDD) or time division duplex (TDD). In most cases an antenna 128 has a single polarized feeding network (vertical, horizontal, left hand circular, or right hand circular). A control unit 130 coordinates the link internal and external operations.

There is a fundamental limit on the capacity of a link which can be achieved for a certain bandwidth B. Capacity can be explained as the maximum number of bits that can be transmitted per second with a probability of error arbitrarily close to zero. According to Shannon's well known capacity theorem, the error free capacity C of a noise limited link of bandwidth B is:

$$C = B \cdot \log_2(1 + SNR) \frac{bits}{second} \quad (1)$$

Where SNR is the signal to noise ratio, which in turn holds all the parameters of the link budget.

In FIG. 1, the usage of a dual polarization feeding network for antenna 128, provides a doubling of the number of links 110 for the same frequency and therefore a doubling of capacity. There is an additional cost in complexity, because most of the hardware has to be doubled and an additional function called cross polar interference canceller (XPIC) has to be added. Because the two polarizations are orthogonal, the two links 110 are independent and the required transmit power for each link remains the same.

However, if it is desired to increase the capacity by more than two-fold other methods must be adopted because there are only two orthogonal polarizations. Based on Shannon's theorem, in order to increase capacity in link(s) 10, signal power needs to be increased by a much larger amount, assuming other variables such as noise, bandwidth, antenna gain and receiver sensitivity are constant. From equation (1), it can be shown that if the capacity of link(s) 110 is doubled, assuming the other variables are constant, the required signal power must be approximately squared.

In order to provide a more reasonable increase in power for a given increase in capacity, multiple (y) independent links operating on the same frequency can be used. Independent links are links whose signals are differentiable from one another. It can be shown that the capacity of y independent links is proportional to the number of links multiplied by the capacity of one link. See for example "Channel capacity of two antenna BLAST architecture, S. L. Lokya, Electronics Letters, Aug. 19, 1999, Volume 35 No. 17.

The number y can also be thought of as equaling the number of transmitting antennas. As an example if the bit rate of a system using one dual polarized transmitting $$C = y \cdot \log_2\left(1 + \frac{SNR}{y}\right) \frac{bits}{second} \quad (2)$$

antenna (two links) is 622 Mbits/sec, then for two dual polarized transmitting antennas (four links) the bit rate will be 1244 Mbits/sec The challenge is therefore to create multiple links operating over the same frequency which are independent of or isolated from each other.

There has been some reporting in the prior art of the usage of the same number of transmitting and receiving antennas for multiple links when the link ends are not in line of sight of each other. For these systems to be efficient, multipath is assumed.

However, for point to point links operating with a clear line of sight between the two ends of the links, in the prior art the number of receiving antennas is larger than the number of transmission antennas in order to separate out the information belonging to each link. See for example, *Advances in Spectrum Analysis and Array Processing*, Volume 3, Chapter 1 by Simon Haykin, Prentice Hall PTR, May 1995, ISBN 130615404. The complexity of the processing is also high.

What is needed in the art is a system and method for multiple point to point line of sight links where the number of receiving antennas can be equal to the number of transmission antennas. What is also needed in the art is an improved beam forming algorithm using multiple statistical values calculated from a constellation or subsets thereof to allow faster convergence.

SUMMARY OF THE INVENTION

According to the present invention there is provided a system for increasing the potential communication capacity between two sites within line of sight of one another, comprising: a plurality of point to point links between the two sites, the plurality of links including at least one beam forming unit and a total of four antennas, wherein a geometrical configuration of the four antennas allows the at least one beam forming unit to substantially differentiate between signals transmitted over the plurality of links, thereby increasing the potential communication capacity compared to a system with only two of the four antennas. According to the present invention, there is also provided a method for increasing the potential communication capacity between two sites within line of sight of one another, including the steps of: providing a total of four antennas at the two sites; selecting a range of values for a function of electrical phase difference for signals to be transmitted between the antennas; and conforming a geometrical configuration of the antennas to a value within the range, wherein the range allows substantial differentiation of transmitted signals and therefore an increase in potential capacity compared to a method providing only two of the four antennas.

According to the present invention, there is further provided a method for increasing the communication capacity between two sites within line of sight of one another, including the steps of: providing two antennas at one site of the two sites, wherein the two antennas at the one site and two antennas at a second site of the two sites have a geometrical configuration which allows substantial differentiation of transmitted signals; and transmitting signals from each of the two antennas at the one site to each of the two antennas at the second site, thereby increasing the capacity compared to a method providing only one of the two antennas at the one site.

According to the present invention, there is still further provided, a method for increasing the communication capacity between two sites within line of site of one another, including the steps of: providing two antennas at one site of the two sites, wherein the two antennas at the one site and two antennas at a second site of the two sites have a geometrical configuration which allows substantial differentiation of signals; each of the two antennas at the one site receiving signals from each of the two antennas at the second site; and performing beam forming to differentiate between signals originating from each of the two antennas at the second site, thereby increasing the capacity compared to a method providing only one of the two antennas at the one site.

According to the present invention, there is still further provided a method for performing beam forming on signals which include symbols encoded by quadrature amplitude modulation, comprising the steps of: providing a first statistical value derived from a constellation which includes all possible symbols; providing at least two other statistical values derived from at least two subsets of the constellation; for a first plurality of iterations, updating filter coefficients using the first statistical value; and for a second plurality of iterations following the first plurality of iterations, updating the filter coefficients using the at least two other statistical values, wherein the updating step using the at least two other statistical values includes for each iteration the step of deciding which of the at least two other statistical values to use.

According to the present invention, there is still further provided a program storage device readable by machine, tangibly embodying a program of instructions executable by the machine to perform method steps for performing beam forming on signals which include symbols encoded by quadrature amplitude modulation, comprising the steps of: providing a first statistical value derived from a constellation which includes all possible symbols; providing at least two other statistical values derived from at least two subsets of the constellation; for a first plurality of iterations, updating filter coefficients using the first statistical value; and for a second plurality of iterations following the first plurality of iterations, updating the filter coefficients using the at least two other statistical values, wherein the updating step using the at least two other statistical values includes for each iteration the step of deciding which of the at least two other statistical values to use.

According to the present invention, there is still further provided an improved computer program product comprising a computer useable medium having computer readable program code embodied therein for performing beam forming on signals which include symbols encoded by quadrature amplitude modulation, the computer program product comprising: computer readable program code for causing the computer to provide a first statistical value derived from a constellation which includes all possible symbols; computer readable program code for causing the computer to provide at least two other statistical values derived from at least two subsets of the constellation; computer readable program code for causing the computer to for a first plurality of iterations, update filter coefficients using the first statistical value; and computer readable program code for causing the computer to for a second plurality of iterations following the first plurality of iterations, update the filter coefficients using the at least two other statistical values, wherein the updating step using the at least two other statistical values includes for each iteration the step of deciding which of the at least two other statistical values to use.

According to the present invention, there is still further provided, a system for increasing the potential capacity between two sites within line of sight of one another, comprising: two antennas at a first of the two sites, wherein the two antennas at the first site, and two antennas at a second of the two sites have a geometrical configuration which allows substantial differentiation of signals transmitted by the first site and therefore increased potential capacity than a system with only one antennas at the first site.

According to the present invention, there is still further provided, a system for increasing the potential capacity between two sites within line of sight of one another, comprising: at least one beam forming unit at a first of the two sites; two antennas at the first site, wherein the two antennas at the first site and two antennas at a second of the two sites have a geometrical configuration which allows the at least one beam forming unit to substantial differentiate between signals received by the first site, thereby increasing potential capacity compared to a system with only one antenna at the first site.

According to the present invention, there is still further provided, a system for increasing the potential capacity between two sites within line of sight of one another, comprising: two antennas at a first of the two sites, wherein the two antennas at the first site, and two antennas at a second of the sites have a geometrical configuration which allows substantial differentiation of signals transmitted by the first site and therefore increased potential capacity than a system with only one antennas at the first site; the geometrical configuration being according to:

$$\text{base line distance} \cong \sqrt{\frac{c \cdot (\text{link distance}) \cdot (\alpha - \beta)}{2\pi f \sin(\theta_1)\sin(\theta_2)}}$$

wherein $2n\pi < (\alpha-\beta) < (2n+2)\pi$, where $n \in (0,1,2, \ldots )$

According to the present invention, there is still further provided, a system for increasing the potential capacity between two sites within line of sight of one another, comprising: at least one beam forming unit at a first of the two sites, two antennas at the first site, wherein the two antennas at the first site and two antennas at a second of the two sites have a geometrical configuration which allows the at least one beam forming unit to substantial differentiate between signals received by the first site, thereby increasing potential capacity compared to a system with only one antenna at the first site; the geometrical configuration being according to:

$$\text{base line distance} \cong \sqrt{\frac{c \cdot (\text{link distance}) \cdot (\alpha - \beta)}{2\pi f \sin(\theta_1)\sin(\theta_2)}}$$

wherein $2n\pi < (\alpha-\beta) < (2n+2)\pi$, where $n \in (0,1,2, \ldots )$

According to the present invention, there is still further provided, a method for increasing the communication capacity between two sites within line of sight of one another, including the steps of: providing two antennas at one site of the two sites, wherein the two antennas at the one site and two antennas at a second site of the two sites have a geometrical configuration which allows substantial differentiation of transmitted signals; and transmitting signals from each of the two antennas at the one site to each of the two antennas at the second site, thereby increasing the capacity compared to a method providing only one of the two antennas at the one site;

wherein the geometrical configuration is according to:

$$\text{base line distance} \cong \sqrt{\frac{c \cdot (\text{link distance}) \cdot (\alpha - \beta)}{2\pi f \sin(\theta_1)\sin(\theta_2)}}$$

and $2n\pi < (\alpha-\beta) < (2n+2)\pi$, where $n \in (0,1,2, \ldots )$

According to the present invention, there is still further provided, a method for increasing the communication capacity between two sites within line of site of one another, including the steps of: providing two antennas at one site of the two sites, wherein the two antennas at the one site and two antennas at a second site of the two sites have a geometrical configuration which allows substantial differentiation of signals; each of the two antennas at the one site receiving signals from each of the two antennas at the second site; and performing beam forming to differentiate between signals originating from each of the two antennas at the second site, thereby increasing the capacity compared to a method providing only one of the two antennas at the one site; wherein the geometrical configuration is according to:

$$\text{base line distance} \cong \sqrt{\frac{c \cdot (\text{link distance}) \cdot (\alpha - \beta)}{2\pi f \sin(\theta_1)\sin(\theta_2)}}$$

and $2n\pi < (\alpha-\beta) < (2n+2)\pi$, where $n \in (0,1,2, \ldots )$

BRIEF DESCRIPTION OF THE DRAWINGS

The invention is herein described, by way of example only, with reference to the accompanying drawings, wherein.

DESCRIPTION OF THE PREFERRED EMBODIMENTS

A preferred embodiment of the present invention is of a point to point wireless system using multiple links with a clear line of sight between the two sites linked by links. Specifically, the preferred embodiment can be used to increase the capacity of a wireless system, using a minimal number of antennas and hardware.

The principles and operation of a point to point communication system according to the present invention may be better understood with reference to the drawings and the accompanying description.

Signals can be defined by amplitude, phase and frequency. In point to point wireless systems, the frequency is generally known. The preferred embodiment of the present invention allows a function of the electrical phase difference to also be set within a certain margin of error, so that signals can be separated out by beam forming using the same number of receiving antennas as transmitting antennas. The function of the electrical phase difference is set by the geometry of the network (i.e. the positioning of the antennas).

In the discussion below, numerous terms including beam forming and spatial filtering are both used to denote the process of differentiating between signals transmitted over various links.

Figure 1:
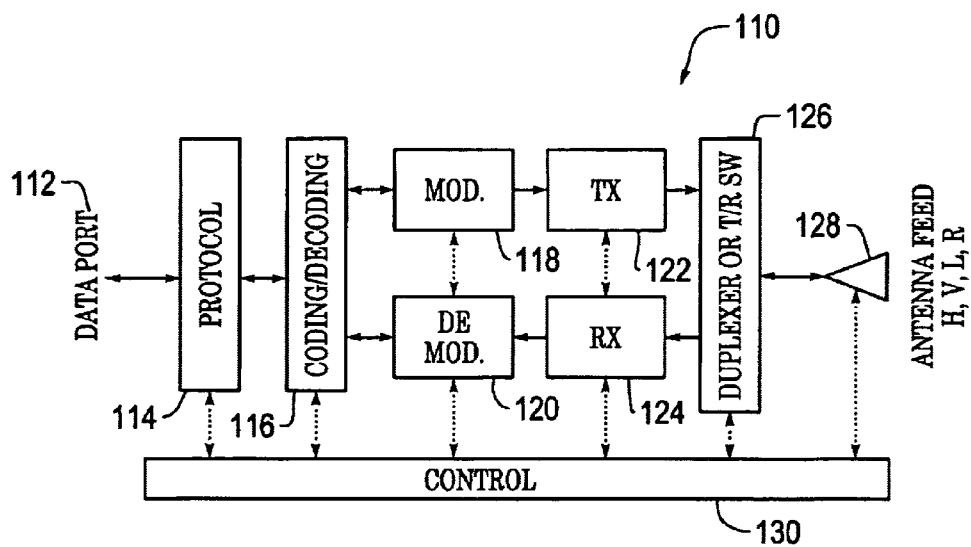
FIG. 1 is a block diagram of a prior art system for a site joined to another site by a single point to point wireless link.
Figure 2:
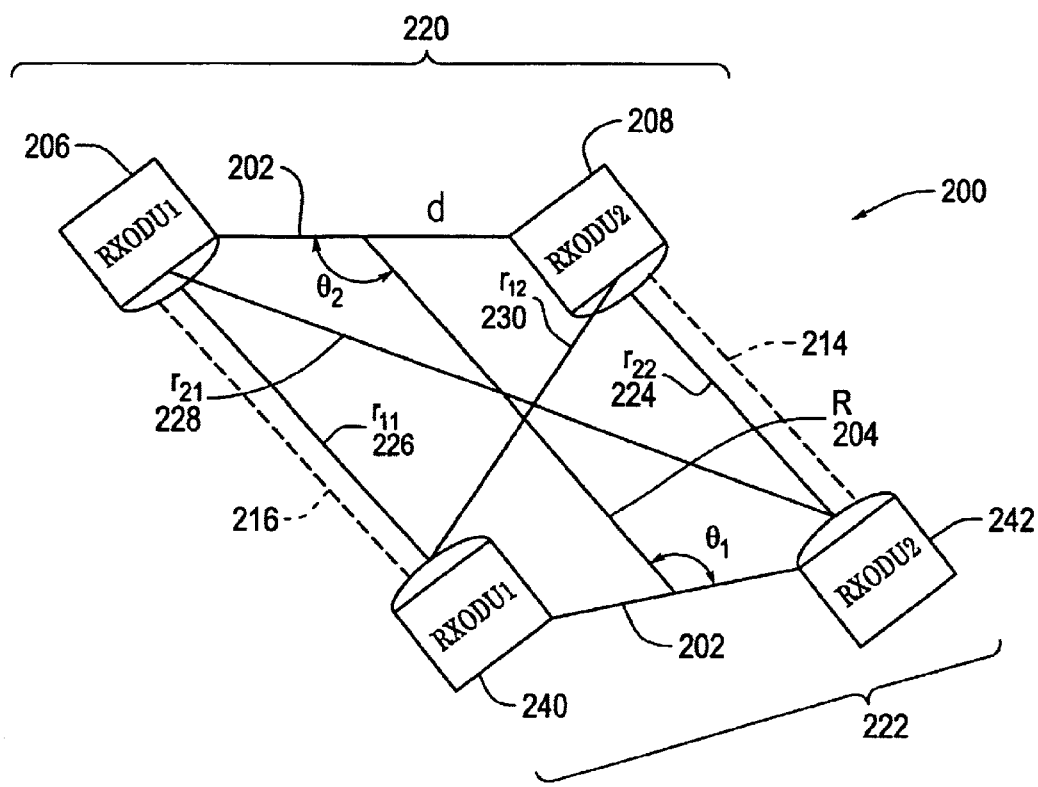
FIG. 2 is a geometrical configuration of a point to point communication network, according to a preferred embodiment of the present invention.

Referring now to the drawings, FIG. 2 illustrates the geometrical configuration of a point to point communication network 200, according to a preferred embodiment of the present invention. The transmitted content can be any content, including voice, data, images, multiplexed combination of all of the above, packaged into SONET/SDH data stream, etc.

Parallel links 214 and 216 are stretched between two sites 220 and 222. Sites 220 and 222 are in clear line of sight of each other. Site 220 includes two antennas 206 and 208, separated by a base line with a distance d 202. Site 222 includes two antennas 210 and 212, also separated by a base line with an equivalent distance d 202. It should be evident that antennas 206 and 208 need not be physically connected, and antennas 210 and 222 need not be physically connected, so that the base lines may be virtual lines. For ease of presentation, a link distance R 204 between sites 220 and 222 is defined by a line approximately connecting the centers of the two base lines. There is an angle $\theta_1$ between the line approximately connecting the two centers and the base line of site 222. An angle $\theta_2$ is between the line approximately connecting the two centers and the base line of site 220. Angles $\theta_1$ and $\theta_2$ may also be considered to be the angles between the baselines and the direction of signal travel between sites 222 and 220. In FIG. 2, only outdoor units (ODU) are shown. Indoor units (IDU) are not shown.

Antennas 206, 208, 210, and 212 can use either single or dual polarization. Polarization can be horizontal/vertical or left hand circular/right hand circular. Assume that in operation not all links 214 and 216 are necessarily used. For example, in certain cases, perhaps only one polarization may be transmitted even though there is a possibility for dual polarization. If all antennas 210,212,206 and 208 are single polarized than there is a maximum of two links 214 and 216 stretched between sites 222 and 220. If all antennas 210, 212,206 and 208 are dual polarized than there is a maximum of four links 214 and 216 between sites 222 and 220. If one set of antennas (where a set includes one transmitting and one receiving antenna) is dual polarized and the other set is single polarized than there is a maximum of three links 214 and 216 between sites 222 and 220. In other words, the number of links is less than or equal to the aggregate number of single polarized antenna sets and twice the number of dual polarized antenna sets.

Parallel links 214 and 216 operate over the same frequency and bandwidth for each direction. In certain preferred embodiments, either frequency division duplex or time division duplex is employed between the two directions.

Each individual transmitting antenna at each site illuminates both of the receiving antennas on the opposite site. Assume, below for ease of explanation, that site 222 (site B) is the transmission site and site 220 (site A) is the receiving site. In such a case, antenna 210 illuminates antennas 206 and 208, and antenna 212 also illuminates antennas 206 and 208. It should be evident that in most cases antennas 206, 208, 210, 212, function as either transmission or receiving antennas depending on the direction of transmission.

Figure 3:
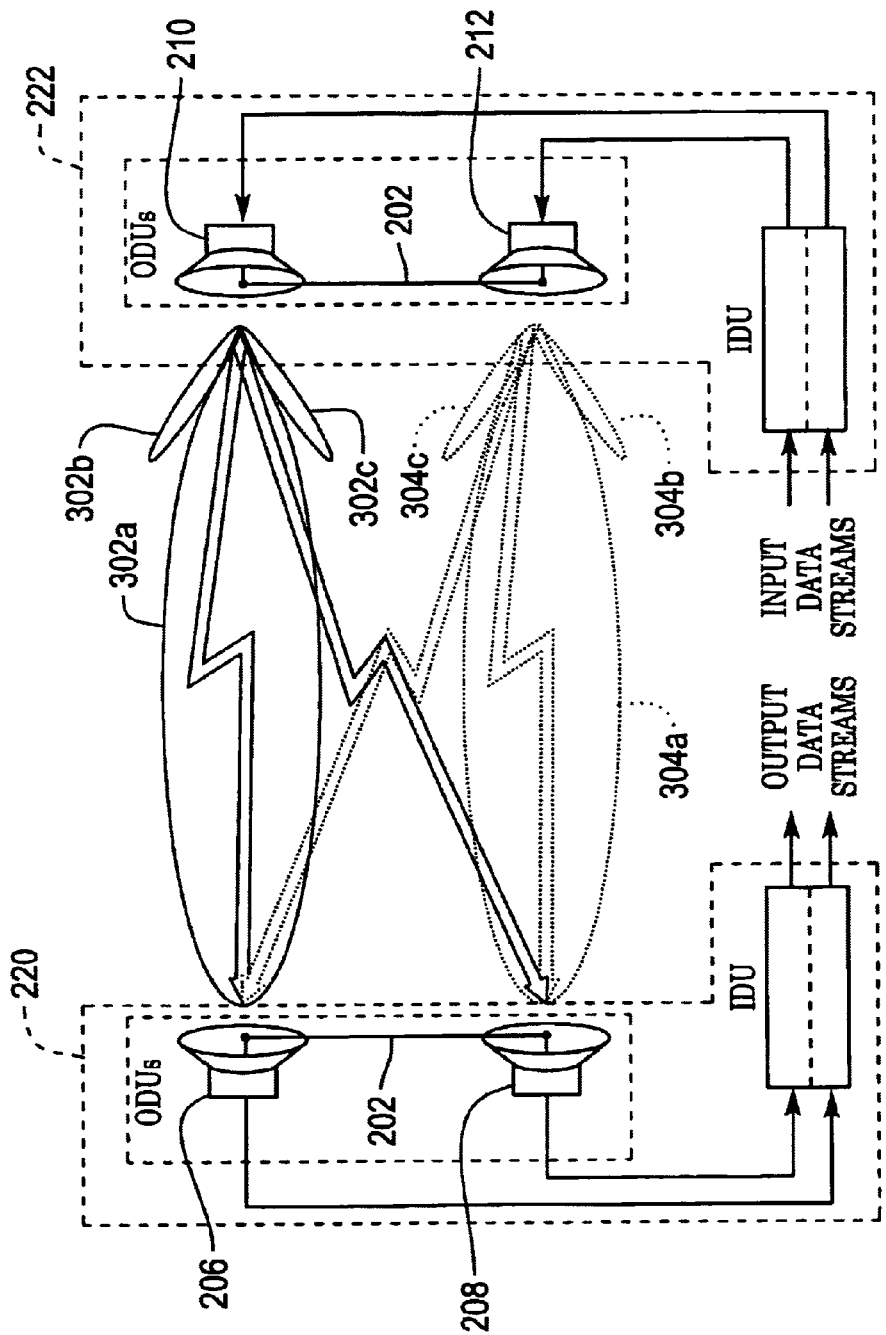
FIG. 3 illustrates the transmission of signals in the network of FIG. 2, according to a preferred embodiment of the present invention.

FIG. 3, shows the transmission of signal 302 from antenna 210 and the transmission of signal 304 from antenna 212, in accordance with a preferred embodiment of the present invention. For each polarization, both signals 302 and 304 illuminate receiving antennas 206 and 208.

Signal 302 travels a distance $r_{11}$ 226 to reach antenna 206. To reach antenna 208, signal 302 travels a distance $r_{12}$ 230. It should be evident that distance 230 is longer than distance 226 and therefore signal 302 will reach antenna 208 with a time delay compared to antenna 206. Assuming signal 302 can be represented as a sine wave, there will be an electrical phase difference of $\alpha$ between signal 302 as received at antenna 208 and signal 302 as received at antenna 206, for each polarization. Similarly, signal 304 travels a longer distance $r_{21}$ 228 to reach antenna 206 than a distance $r_{22}$ 224 to reach antenna 208. Therefore there will be an electrical phase difference of $\beta$ (which in this example will be negative) between signal 304 as received at antenna 208 and signal 304 as received at antenna 206, for each polarization. It should be evident that the definitions of $\alpha$ and $\beta$ are for convenience of explanation and can be defined differently.

Figure 4:
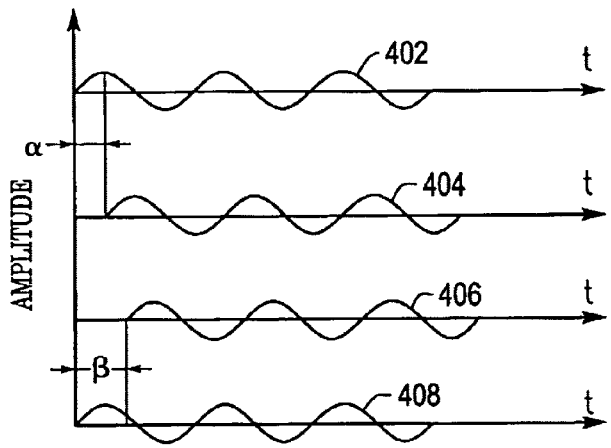
FIG. 4 illustrates the phase differences of the transmitted signals when received at the receiving antennas, according to a preferred embodiment of the present invention.

FIG. 4 illustrates the phase differences, in accordance with a preferred embodiment of the present invention. Signal 402 is signal 302 as received at antenna 206. Signal 404 is signal 302 as received at antenna 208. Signal 406 is signal 304 as received at antenna 206. Signal 408 is signal 304 as received at antenna 208.

In equation form:

$$\frac{\text{phase difference}}{2\pi} = \frac{\text{path difference}}{\lambda} \quad \text{where}$$

$$\lambda = \frac{c}{f}$$

c=speed of light=$3\times10^8$ m/s and f=link center frequency (Hz). All links operate at the same frequency.

For network 200:

$$\frac{\alpha}{2\pi} = \frac{(\text{Distance } 230 - \text{Distance } 226) \cdot f}{c}$$

$$\frac{\beta}{2\pi} = \frac{(\text{Distance } 224 - \text{Distance } 228) \cdot f}{c}$$

Assuming base line distance 202 is much less than link distance 204, for example assuming base line distance 202 is 10% or less of link distance 204, then using geometry, base line distance 202 can be approximated as $$\text{base line distance } 202 \cong \sqrt{\frac{c \cdot (\text{link distance } 204) \cdot (\alpha - \beta)}{2\pi f \sin(\theta_1)\sin(\theta_2)}} \quad (3)$$

Equation 3 shows that the geometry of network 200 (i.e. base line distance 202, link distance 204, and angles $\theta_1$ and $\theta_2$) is related to the electrical phase difference, or more precisely a function of the electrical phase difference, in this case the difference in electrical phase difference. $(\alpha-\beta)$. Therefore a given geometry sets $\alpha-\beta$ within a margin of error. Preferably a value for $(\alpha-\beta)$ is first selected, such as constant $(\alpha-\beta)=\pi$, and a geometry of network 200 is adopted to produce the desired $(\alpha-\beta)$ within a margin of error. The actual $(\alpha-\beta)$ may vary from the desired value due to for example, weather conditions such as wind, inaccuracy in setting up the network according to the required geometry, etc. Preferably the margin of error (i.e. variance from the desired value) for $(\alpha-\beta)$ is not more than 10%.

In equation 3, base line distance 202 is shown as a function of the other variables because in many implementations, link distance 204, and angles $\theta_1$ and $\theta_2$ are less adjustable than base distance 202 due to other considerations. In other implementations, the angles $\theta_1$ and $\theta_2$ are adjustable and can be adjusted so as to reduce base line distance 202. However, it should be evident that any of variables, $(\alpha-\beta)$, base line distance 202, link distance 204, angles $\theta_1$ and $\theta_2$, may be solved for using equation 3, providing base line distance 202 is much less than link distance 204.

For the special case of $\theta_1$ and $\theta_2$ both equal 90 degrees. Equation (3) reduces $$\text{base line distance } 202 \cong \sqrt{\frac{c \cdot (\text{link distance } 204) \cdot (\alpha - \beta)}{2\pi f}} \quad (4)$$

For the special case of $(\alpha-\beta)=180$ degrees, equation (3) reduces to $$\text{base line distance } 202 \cong \sqrt{\frac{c \cdot (\text{link distance } 204)}{2f \sin(\theta_1)\sin(\theta_2)}} \quad (5)$$

For the special case of $\theta_1$ and $\theta_2$ both equal to 90 degrees and $(\alpha-\beta)=180$ degrees, equation (3) reduces to $$\text{base line distance } 202 \cong \sqrt{\frac{c \cdot (\text{link distance } 204)}{2f}} \quad (6)$$

A proof for the derivation of equation (3) is presented below:

$$r_{12} - r_{11} = \frac{r_{12}^2 - r_{11}^2}{r_{12} + r_{11}} r_{11}^2 =$$

$$\left(R\sin\theta_2 + \frac{d}{2}\sin(\theta_2 - \theta_1)\right)^2 + \left(\frac{d}{2}(1 - \cos(\theta_2 - \theta_1))^2 - R\cos\theta_2\right)^2$$

$$r_{12}^2 = \left(R\sin\theta_2 + \frac{d}{2}\sin(\theta_2 - \theta_1)\right)^2 + \left(\frac{d}{2}(1 + \cos(\theta_2 - \theta_1))^2 R\cos\theta_2\right)^2$$

$$r_{12}^2 - r_{11}^2 = 2Rd\cos\theta_2 - \frac{d^2}{4}[(1 - \cos(\theta_2 - \theta_1))^2 - (1 + \cos(\theta_2 - \theta_1))^2] =$$

$$d^2\cos(\theta_2 - \theta_1) + 2Rd\cos\theta_2$$

$$r_{22} - r_{21} = \frac{r_{22}^2 - r_{21}^2}{r_{22} + r_{21}}$$

$$r_{21}^2 = \left(R\sin\theta_2 - \frac{d}{2}\sin(\theta_2 - \theta_1)\right)^2 + \left(\frac{d}{2}(1 + \cos(\theta_2 - \theta_1))^2 - R\cos\theta_2\right)^2$$

$$r_{22}^2 = \left(R\sin\theta_2 - \frac{d}{2}\sin(\theta_2 - \theta_1)\right)^2 + \left(\frac{d}{2}(1 - \cos(\theta_2 - \theta_1))^2 + R\cos\theta_2\right)^2$$

$$r_{22}^2 - r_{21}^2 = 2Rd\cos\theta_2 - \frac{d^2}{4}[(1 + \cos(\theta_2 - \theta_1))^2 - (1 - \cos(\theta_2 - \theta_1))^2] =$$

$$2Rd\cos\theta_2 - d^2\cos(\theta_2 - \theta_1)$$

$$r_{11} + r_{12} \cong R\left(2 + \frac{d}{R}\cos\theta_1 + \frac{d^2}{2R^2}\right)$$

$$r_{21} + r_{22} \cong R\left(2 - \frac{d}{R}\cos\theta_1 + \frac{d^2}{2R^2}\right)$$

$$\Rightarrow (r_{12} - r_{11}) - (r_{21} - r_{22}) \cong$$

$$\frac{2Rd\cos\theta_2 + d^2\cos(\theta_2 - \theta_1)}{R\left(2 + \frac{d}{R}\cos\theta_1 + \frac{d^2}{2R^2}\right)} - \frac{2Rd\cos\theta_2 - d^2\cos(\theta_2 - \theta_1)}{R\left(2 - \frac{d}{R}\cos\theta_1 + \frac{d^2}{2R^2}\right)} =$$

$$\frac{d^2\cos(\theta_2 - \theta_1)}{R}\left(\frac{1}{\left(2 + \frac{d}{R}\cos\theta_1 + \frac{d^2}{2R^2}\right)} + \frac{1}{\left(2 - \frac{d}{R}\cos\theta_1 + \frac{d^2}{2R^2}\right)}\right) +$$

$$2d\cos\theta_2\left(\frac{1}{\left(2 + \frac{d}{R}\cos\theta_1 + \frac{d^2}{2R^2}\right)} - \frac{1}{\left(2 - \frac{d}{R}\cos\theta_1 + \frac{d^2}{2R^2}\right)}\right) \cong$$

$$\frac{d^2\cos(\theta_2 - \theta_1)}{R} + 2d\cos\theta_2\left(\frac{-d\cos\theta_1}{2R}\right) = \frac{d^2}{R}(\cos(\theta_2 - \theta_1) - \cos\theta_1\cos\theta_2)$$

$$(r_{12} - r_{11}) - (r_{22} - r_{21}) \cong \frac{d^2}{R}\sin\theta_1\sin\theta_2$$

$$\alpha - \beta = 2\pi\frac{f}{c}((r_{12} - r_{11}) - (r_{22} - r_{21})) \cong 2\pi\frac{f}{c}\frac{d^2}{R}\sin\theta_1\sin\theta_2$$

$$\Rightarrow d \cong \sqrt{(\alpha - \beta)\frac{cR}{2\pi f \sin\theta_1\sin\theta_2}}$$

As the signals are periodic, base line distance 202 can be increased by choosing an $(\alpha-\beta)$ which is not part of the first cycle (0 to $2\pi$) but part of later cycles.

As an example $(\oplus-\beta)$ equal to $\pi/2$ or $5\pi/2$ implies signals which are theoretically equivalently distinguishable. In some cases, a later cycle may be chosen because placement at a distance d 202 corresponding to the first cycle is difficult due to the topography of the system. The maximum cycle that can be chosen and therefore also base line distance 202 is however limited by the beam width of the transmitting antenna. It is necessary that base line distance 202 between receiving antennas 206 and 208 be sufficiently small that the beams of the transmitting antennas 210 and 212 reaches both receiving antennas 206 and 208.

Referring back to FIG. 3, signal 302 and signal 304 should both reach both receiving antennas 206 and 208. Preferably, the main lobes of beams 302 and 304, i.e. loops 302a and 304a should reach both receiving antennas 206 and 208. In this case the amplitude of signal 302, received by antennas 206 and 208 is the same, and the amplitude of signal 304 as received by antennas 206 and 208 is the same.

For the generalized case of $(\alpha-\beta)=(2n+1)\pi$, where $n \in (0, 1, 2, \ldots )$., equations 5 and 6 become $$\text{base line distance } 202 \cong \sqrt{\frac{(2n+1)c \cdot (\text{link distance } 204)}{2f \sin(\theta_1)\sin(\theta_2)}} \quad (5a)$$

$$\text{base line distance } 202 \cong \sqrt{\frac{(2n+1)c \cdot (\text{link distance } 204)}{2f}} \quad (6a)$$

Figure 5:
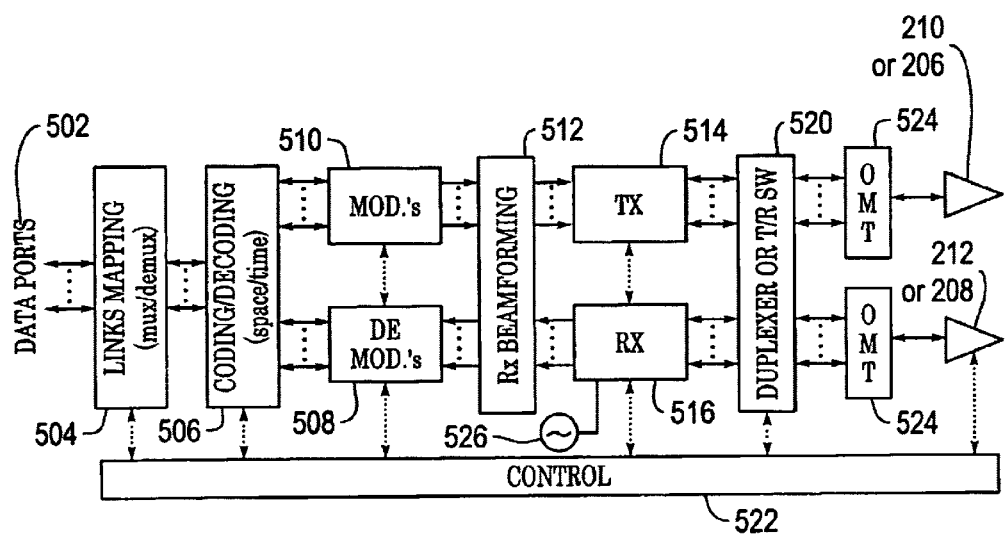
FIG. 5 is a block diagram of a system for a site in the network of FIG. 2, according to a preferred embodiment of the present invention.

FIG. 5 shows a system 500 block diagram of site 220 or 222, in accordance with a preferred embodiment of the current invention. The components of system 500 are standard, other than the number of antennas and beam forming unit 512. It should be evident that the components can be combined or separated into fewer or more components.

Data ports 502 may be a single data port (input/output connection) or multiple data ports. In the case of data port 502 being a single data port, both 214 and 216 are sub-links and system 500 acts as a single port wireless point to point connection. Each sub-link 214 and 216 conveys part of the bit rate of data port 502, and a mapping procedure 504 preferably prioritizes the data stream. All description of the preferred embodiments above and below referring to links, apply equally well to sub-links.

In the case of multiple data ports 504, both 214 and 216 are links and system 500 acts as multiple independent ports wireless point to point links. Mapping procedure 504 preferably prioritizes data ports 504.

In either case of data port 502 being a single port or multiple ports, mapping procedure 504 preferably supports graceful degradation in the case of failure in the transmitters 514, receivers 516, or antennas 206,208,210, and 212. Mapping procedure 504 is preferably part of the protocol and supports the links management, status and network management.

Preferably local oscillator 526 ensure that receivers 516 are coherent (i.e. operate at the same frequency and constant phase difference.)

Optionally, spatial/temporal and/or temporal coding/decoding schemes for forward error correction is performed by component 506 prior to transmission and/or after reception. The data may be sub-coded independently or together.

Orthogonal mode transducer(s)(OMT) 524 allow antenna 210,212,206,and/or 208 to transmit or receive dual polarization.

In the preferred embodiment presented below, beam forming is performed completely at receiving site 220 by component 512. In other preferred embodiments, beam forming may be performed at transmission site 222 in addition to or instead of the receiving beam forming, with necessary changes implemented in beam forming component 512.

For ease of understanding in the discussion below, it will be assumed that data port 502 includes multiple data ports and therefore 214 and 216 are links.

Assume also that all links 214 and 216 are used for antennas 206, 208, 210, and 214 which are dual polarized (horizontal/vertical).

Figure 6:
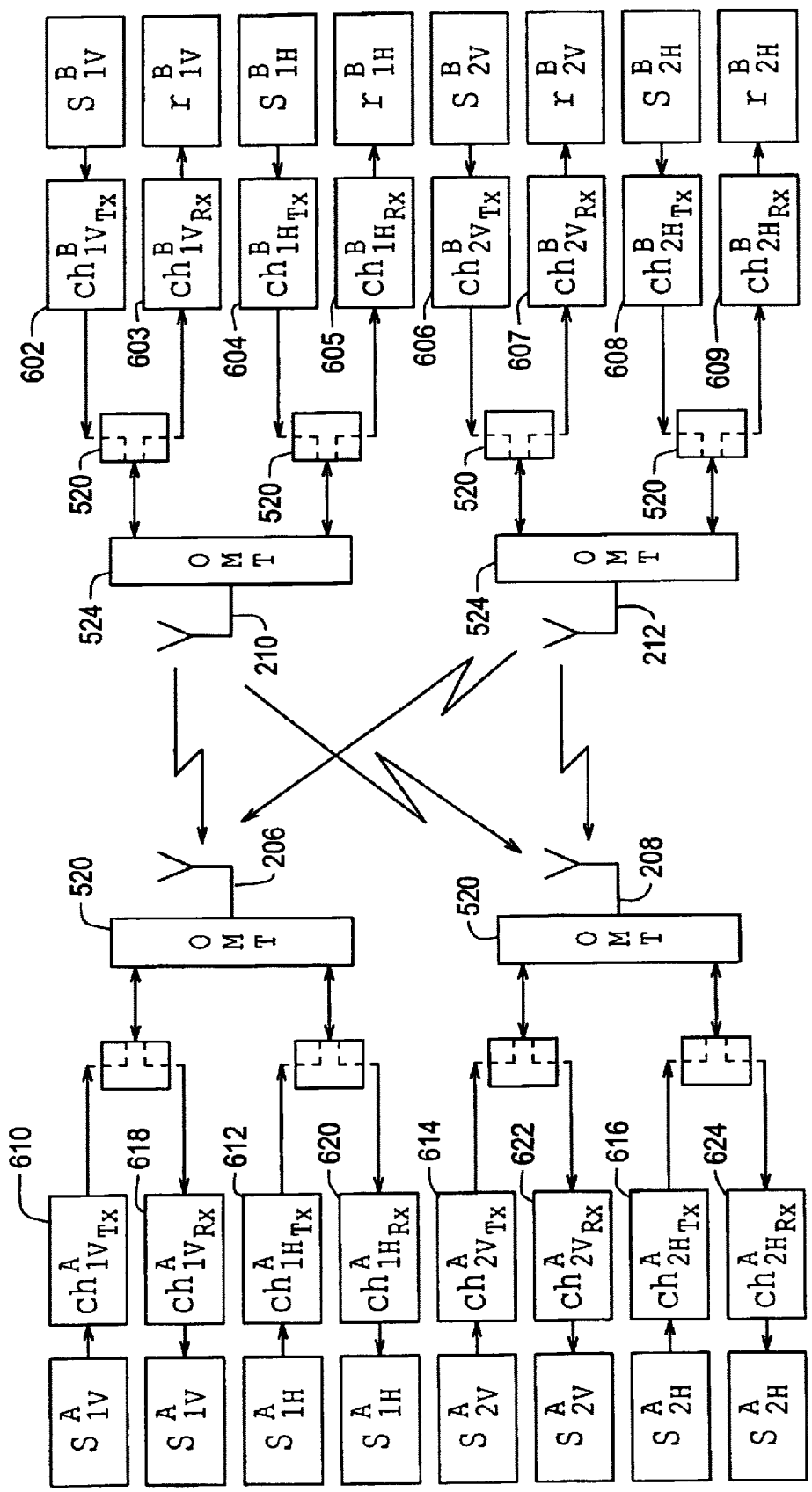
FIG. 6 illustrates a nomenclature convention for the transmitted and received signals, according to a preferred embodiment of the present invention.

Refer to FIG. 6 which shows the nomenclature convention used for transmitted and received signals, according to a preferred embodiment of the present invention. Each site 220 (A) and 222 (B) are assumed to have both transmission and reception capabilities. Channels 602 through 624 are assumed to include the analog parts of system 500. It is assumed that the received signals (r) are observed after the signals have passed through the receiving channels 618, 620,622 and 624 at site 220 at site 220 or 603, 605, 607, and 609 at site 222. Similarly, it is assumed that the sent signal (s) are observed before the signals have passed through transmitting channels 602, 604, 606, and 608 at site 222 or 610, 612, 614, and 616 at site 220. It is also assumed that duplexers or T/R switch 520, and receivers 516 form part of receiving channels 618, 620,622, 624 603, 605, 607, and 609, and duplexers or T/R switch 520, and transmitters 514 form part of transmitting channels 602, 604, 606, 608, 610, 612, 614, and 616. It should be evident that these classifications are arbitrary and that the received or sent signals can be observed at different points in system 500, that channels can be defined otherwise and that functions of system 500 can be divided differently between digital and analog components.

The received signals at site A 220 can be described as:

$$r^A_{1V} = 10^{-Att/10}\left[S^B_{1V} * ch^B_{1V_{Tx}} * ch^A_{1V_{Rx}} + S^B_{2V} * ch^B_{2V_{Tx}} * ch^A_{1V_{Rx}} + \right.$$
$$\left. 10^{-XPD/10}\left(S^B_{1H} * ch^B_{1H_{Tx}} * ch^A_{1V_{Rx}} + S^B_{2H} * ch^B_{2H_{Tx}} * ch^A_{1V_{Rx}}\right)\right] + n_{1V}$$

$$r^A_{2V} = 10^{-Att/10}\left[S^B_{1V}e^{j\alpha} * ch^B_{1V_{Tx}} * ch^A_{2V_{Rx}} + S^B_{2V}e^{j\beta} * ch^B_{2V_{Tx}} * ch^A_{2V_{Rx}} + \right.$$
$$\left. 10^{-XPD/10}\left(S^B_{1H}e^{j\alpha} * ch^B_{1H_{Tx}} * ch^A_{2V_{Rx}} + S^B_{2H}e^{j\beta} * ch^B_{2H_{Tx}} * ch^A_{2V_{Rx}}\right)\right] + n_{2V}$$

$$r^A_{1H} = 10^{-Att/10}\left[S^B_{1H} * ch^B_{1H_{Tx}} * ch^A_{1H_{Rx}} + S^B_{2H} * ch^B_{2H_{Tx}} * ch^A_{1H_{Rx}} + \right.$$
$$\left. 10^{-XPD/10}\left(S^B_{1V} * ch^B_{1V_{Tx}} * ch^A_{1H_{Rx}} + S^B_{2V} * ch^B_{2V_{Tx}} * ch^A_{1H_{Rx}}\right)\right] + n_{1H}$$

$$r^A_{2H} = 10^{-Att/10}\left[S^B_{1H}e^{j\alpha} * ch^B_{1H_{Tx}} * ch^A_{2H_{Rx}} + S^B_{2H}e^{j\beta} * ch^B_{2H_{Tx}} * ch^A_{2H_{Re}} + \right.$$
$$\left. 10^{-XPD/10}\left(S^B_{1V}e^{j\alpha} * ch^B_{1V_{Tx}} * ch^A_{2H_{Rx}} + S^B_{2V}e^{j\beta} * ch^B_{2V_{Tx}} * ch^A_{2H_{Rx}}\right)\right] + n_{2H}$$

where
Att—Power attenuation of the channel (free space attenuation) [dB].
XPD—cross polarization discrimination (power) [dB]
$r^A_{1V}$ is the vertical polarization of the signal received by antenna 206

$S^B_{1V}$ is the vertical polarization of the signal sent by antenna 210

$n_{1V}$ is the noise received at antenna 206 in the vertical polarization $r^A_{2V}$ is the vertical polarization of the signal received at antenna 208

$S^B_{2V}$ is the vertical polarization of the signal sent by antenna 212

α is the electrical phase difference defined for network 200

β is the electrical phase difference defined for network 200

$n_{2V}$ is the noise received at antenna 208 in the vertical polarization $r^A_{1H}$ is the horizontal polarization of the signal received by antenna 206

$S^B_{1H}$ is the horizontal polarization of the signal sent by antenna 210

$n_{1H}$ is the noise received at antenna 206 in the horizontal polarization $r^A_{2H}$ is the horizontal polarization of the signal received at antenna 208

$S^B_{2H}$ is the horizontal polarization of the signal sent by antenna 212

$n_{2H}$ is the noise received at antenna 208 in the horizontal polarization

* represents convolution and is used in the calculation of inter-symbol interference (ISI)

Figure 7:
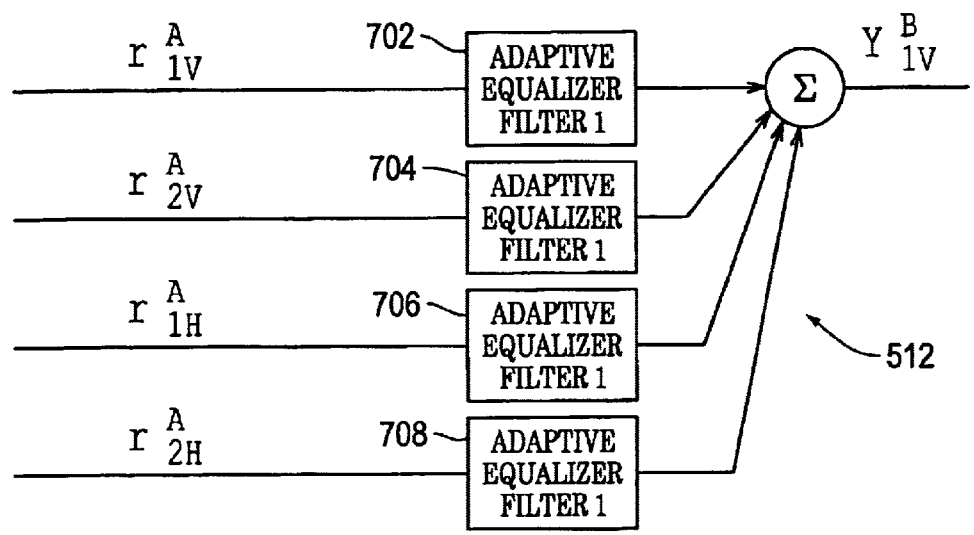
FIG. 7 is a block diagram of the part of a beam forming unit for estimating the signal in the vertical polarization from the first transmitting antenna, according to a preferred embodiment of the present invention.

It should be evident that if transmission were in the opposite direction, the signals would be received at site B 222, and could be computed using parallel equations (superscript B and A would be interchanged). Below, for simplicity, the beam forming process is explained for signal transmission from site B 222 to site A 220. The beam forming process for transmission in the opposite direction can be similarly developed by one versed in the art. Beam forming unit 512 at site 220 (A) receives $r^A_{1V}$, $r^A_{2V}$, $r^A_{1H}$, and $r^A_{2H}$ and outputs signals $Y^B_{1V}$, $Y^B_{2V}$, $Y^B_{1H}$, and $Y^B_{2H}$ which are best estimates of $S^B_{1V}$, $S^B_{2V}$, $S^B_{1H}$, and $S^B_{2H}$ respectively. FIG. 7 illustrates a preferred embodiment of the beam forming for $Y^B_{1V}$. It should be evident that beam forming unit 512 at site B 222 preferably includes three other beam forming sub-units in order to output $Y^B_{2V}$, $Y^B_{1H}$, and $Y^B_{2H}$. There are four filters 702, 704, 706, and 708 shown in FIG. 7. Adaptive equalizer filter 702 receives $r^A_{1V}$ and removes inter-symbol interference (ISI). In addition equalizer filter 702 fixes variation of symbol sampling from the ideal sampling point. Adaptive spatial filter 704 receives $r^A_{2V}$ and removes interference from other signals of the vertical polarization. Adaptive cross polarization filters 706 and 708 receive $r^A_{1H}$ and $r^A_{2H}$ respectively and remove interference from signals in the horizontal polarization. The noise is thermal Additive White Gaussian Noise (AWGN).

Figure 8:
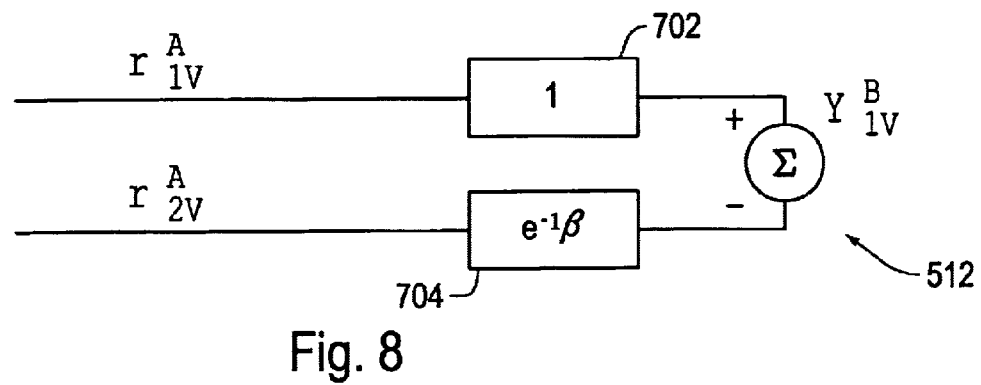
FIG. 8 is a reduced block diagram under idealized communication conditions of the block diagram of FIG. 7, according to a preferred embodiment of the present invention.

As mentioned above, the geometry of system 200 allows the same number of receiving antennas as transmitting antennas because α–β can be selected and set by correct geometrical configuration. Below it will be shown why in the best case α–β is as close as possible to (2n+1)π, for example (2n+1)π±10%, where n ∈(0,1,2, . . . ) (up to a limit set by transmission beamwidth). For ease of understanding, assume an ideal case where channels 602 through 624, transmitters 514, and receivers 516 are considered to have flat frequency response, that is memory-less and therefore no inter-symbol interference is created. XPD is assumed to be infinite (i.e. no cross-polarization interference). In this case, a beam forming network to extract $y^B_{1V}$ from $r^A_{1V}$ and $r^A_{2V}$ is readily solved. See FIG. 8 which shows an example of a solution. Filter 702 consists of a filter of coefficient 1 and filter 704 consists of a filter of coefficient $e^{-j\beta}$. $Y^B_{1V}$ is solved to give:

$$Y^B_{1V} = s^B_{1V}(1-e^{j(\alpha-\beta)}) + n_{1V} - n_{2V}e^{-j\beta}. \tag{8}$$

Assuming $n_{1V}$ and $n_{2V}$ are IID (independent identically distributed random variables) and $E\{n_{1V}\}=E\{n_{2V}\}=0$, the signal to noise ratio is:

$$SNR = 10\log_{10}\left[\frac{E\{(s^B_{1V}|1-e^{j(\alpha-\beta)}|)^2\}}{E\{(|n_{1V}-n_{2V}e^{-j\beta}|)^2\}}\right] = 10\log_{10}\left[\frac{2\sigma^2_{s^B_{1V}}\cos(\alpha-\beta)}{\sigma^2_{n_{1V}}+\sigma^2_{n_{2V}}}\right]$$

where $\sigma^2_{s^B_{1V}} \equiv E\{(s^B_{1V})^2\}$ and $\sigma^2_{n_{1,2V}} \equiv E\{(n_{1,2V})^2\}$ Assuming in addition that $\sigma_{n_{1V}}^2 = \sigma_{n_{2V}}^2 \equiv \sigma_n^2$ $$SNR = 10\log_{10}\left[\frac{\sigma^2_{s^B_{1V}}}{\sigma^2_n}\right] + 10\log_{10}(1-\cos(\alpha-\beta)) \tag{9}$$

In the best case (α–β)=(2n+1)π, where n ∈(0,1,2, . . . ), and the signal to noise ratio for system 200 is 3 dB above the case of a single link. Note that in the case of a single link the signal to noise ratio would equal $$10\log_{10}\left[\frac{\sigma^2_{s^B_{1V}}}{\sigma^2_n}\right].$$

In the singular case (α–β)=2nπ, where n ∈(0,1,2, . . . ), there is no way to recover the signals.

In practice, beam forming can be performed as long as α–β is sufficiently different from 2nπ (where n ∈(0,1,2, . . . ) with performance increasing gradually as α–β approaches the best case of (2n+1)π.

Assuming that for equation (3), $\theta_1\theta_2$ and link distance 204 are selected based on other considerations such as installation requirements, it is possible to configure antenna base line d 202 so that maximum SNR is achieved i.e. (α–β) as close as possible to (2n+1)π, n ∈(0,1,2, . . . ) In other cases where other considerations do not allow an antenna base line d 202 which gives maximum SNR, the configuration should be adjusted so that (α–β) is as far as possible from 2nπ in that particular implementation, where n ∈(0, 1, 2, . . . )

In the non ideal case, the energy of the different types of interference can be assumed to be possibly as high as the energy of the signal which needs to be recovered. Interferences include the following. Inter-symbol interference varies in time for each channel of receiving and transmitting. Additionally, the frequency and phase vary in time for each channel. In addition, there is interference between co-channel transmissions of the same polarization and of orthogonal polarization. The interference between transmissions is at least partly because of the shared frequency.

Figure 9:
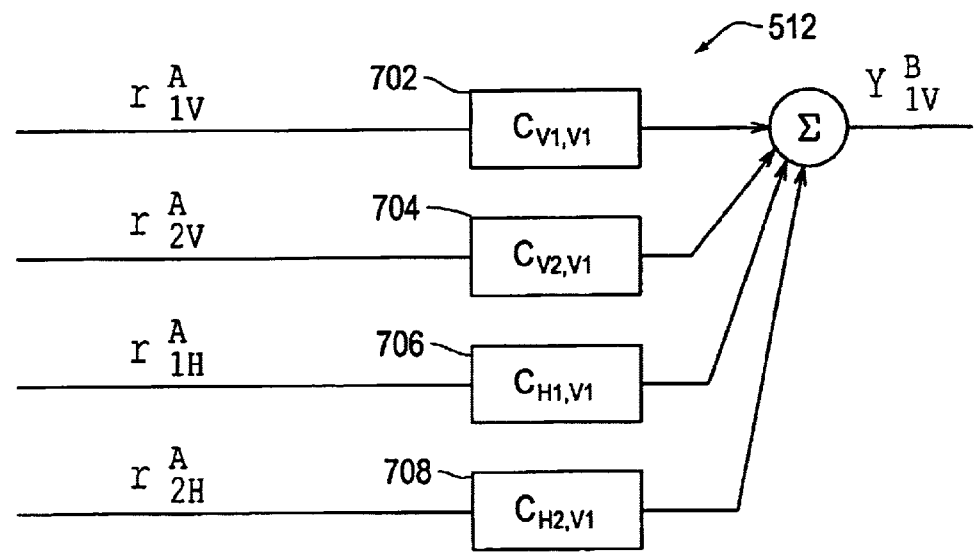
FIG. 9 illustrates a nomenclature convention for the coefficients of the filters in the block diagram of FIG. 7, according to a preferred embodiment of the present invention.

FIG. 9 illustrates filters 702, 704, 706 and 708 under non-idealized conditions, according to a preferred embodiment of the present invention. The filters 702, 704, 706 and 708 are used to remove the types of interference mentioned above. $C_{v1,v1}$ is the complex filter coefficient for a filter with input signal $r^A_{1V}$ which is used to calculate $Y^B_{1V}$ (the estimate of $S^B_{1V}$). $C_{V2,V1}$ is the complex filter coefficient for a filter with input $r^A_{2V}$ which is used to calculate $Y^B_{1V}$. $C_{H1,V1}$ is the complex filter coefficient for a filter with input $r^A_{1H}$ which is used to calculate $Y^B_{1V}$. $C_{H2,V1}$ is the complex filter coefficient for a filter with input $r^A_{2H}$ which is used to calculate $Y^B_{1V}$.

Similarly $C_{V1V2}$, $C_{V2V2}$, $C_{H1V2}$, $C_{H2V2}$ for $Y^B_{2V}$ (the estimate of $S^B_{2V}$), $C_{V1H1}$, $C_{V2H1}$, $C_{H1H1}$, $C_{H2H1}$ for $Y^B_{1H}$ (the estimate of $S^B_{1H}$), and $C_{V1H2}$, $C_{V2H2}$, $C_{H1H2}$, $C_{H2H2}$ for $Y^B_{2H}$ (the estimate of $S^B_{2H}$) can be defined.

In a preferred embodiment of the present invention, the first stage of determining the coefficients of the filters uses a "blind" algorithm. The first stage includes acquisition followed by updating. The first stage is preferably re-performed on power up or under other conditions when network 200 breaks down (for example heavy rain).

Figure 10:
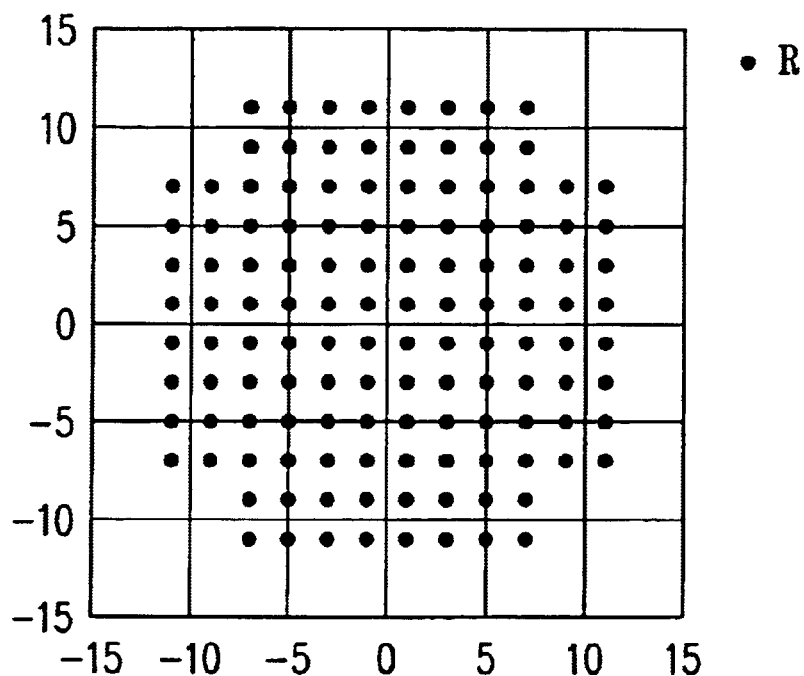
FIG. 10 illustrates a constellation of symbols for 128 quadrature amplitude modulation (QAM), according to a preferred embodiment of the present invention.

As a non-limiting example, it is assumed that 128 quadrature amplitude modulation (QAM) is used to encode the bits into symbols prior to transmission (for example by modulator 510). Each seven bits are represented by one point (i.e. symbol). At reception site 220, the sent point is estimated (for example using beam forming unit 512) and decoded back to seven bits (for example using demodulator 508 and decoding section 506). All possible points together form a constellation. An example of a constellation for 128 QAM is shown in FIG. 10. Each point in the constellation follows the equation:

$X_i = (2k+1) + j(2l+1)$, with the possible values of k, l easily determinable from FIG. 10.

It is assumed that both transmission site 222 and reception site 220 have calculated and preferably stored a single statistical value derived from the constellation called here R:

$$R_n = \frac{\sum_n |x_i|^4 \cdot p(x_i)}{\sum_n |x_i|^2 \cdot p(x_i)} \quad (10)$$

Assume that for maximum entropy, each point has an equal probability so $$R_n = \frac{\sum_n |x_i|^4}{\sum_n |x_i|^2}$$

and in regard to the example of 128 QAM:

$$R = \frac{\sum_{i=0}^{127} |x_i|^4}{\sum_{i=0}^{127} |x_i|^2} = 110.1$$

Using the calculated R, the coefficients of FIG. 9 are updated so that the error of the amplitude of $Y^B_{1V}$ (estimate of transmitted point) is minimized. For the n+1 iteration $$\underline{C}_{v1v1}^{n+1} = \underline{C}_{v1v1}^n - \mu \underline{r}^A_{1V}{}^*[k]e[k]Y^B_{1V}[k] \quad (11)$$

where $$e[k] = |Y^B_{1V}[k]|^2 - R \quad (12)$$

k is a time index to ensure that e.g. $r^A_{1V}$, e, and $Y^B_{1V}$ are related in time

* represents the conjugate and $$r^A_{1V}[k] = \begin{bmatrix} \cdot & r^A_{1V}[k] \\ \cdot & \\ \cdot & r^A_{1V}[k-N+1] \end{bmatrix}$$

The order of the filter, N, in some preferred embodiments is selected based on the channel characteristics, multipath (if any), and required performance.

Preferably the number of iterations followed allows signal to interference and noise distortion to reach an acceptable level.

$\mu$ is the gain of the control loop could be adaptable

Similarly all other coefficients of FIG. 9 can be calculated for the first vertical link $$\underline{C}_{V2V1}^{n+1} = \underline{C}_{V2V1}^n - \mu \underline{r}^A_{2V}{}^*[k]e[k]Y^B_{1V}[k]$$

$$\underline{C}_{H1V1}^{n+1} = \underline{C}_{H1V1}^n - \mu \underline{r}^A_{1H}{}^*[k]e[k]Y^B_{1V}[k]$$

$$\underline{C}_{H2V1}^{n+1} = \underline{C}_{H2V1}^n - \mu \underline{r}^A_{2H}{}^*[k]e[k]Y^B_{1V}[k]$$

It should be evident that the coefficients for the other links can be calculated through similar calculations.

In a preferred embodiment in addition to R, other statistical values for subsets of the constellation were calculated and preferably stored. Once the system has performed a sufficient number of iterations, these statistical values for the subsets of the constellation can be used instead in the update error equation 12 to increase the signal to interference and noise distortion level.

Figure 11:
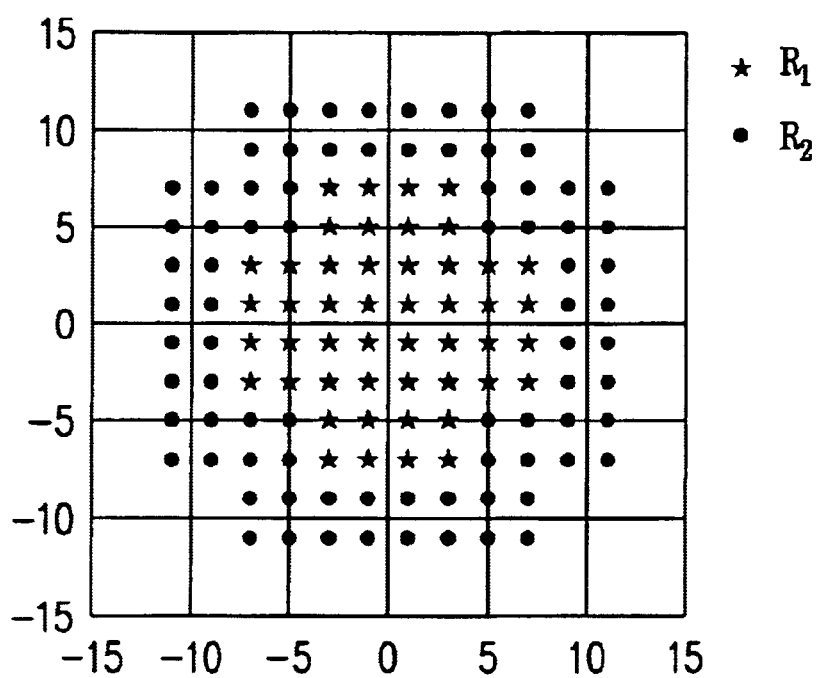
FIG. 11, illustrates the constellation of FIG. 10, divided into two subsets, according to a preferred embodiment of the present invention.

Refer to FIG. 11, which shows as an example the constellation divided into two areas. It should be evident that the constellation can be divided differently than shown and/or into more subsets. The division shown allows approximately a similar number of points in each subset. In addition, the division attempts to cause as great a difference as possible between the amplitudes of the points in the two subsets. In other words the amplitude of the largest point in the smaller-amplitude group should be distinguishable from the amplitude of the smallest point in the higher-amplitude group $$|X_i| \leq \sqrt{58}$$

leads to $R_1 = 43.2$; and $$|X_i| > \sqrt{58}$$

leads to $R_2 = 123.1$

The update procedure selects either $R_1$ or $R_2$ based on the amplitude of $Y^B_{v1}[k]$ and the step t of the process, and uses the selected $R_1$ or $R_2$ instead of R in error update equation 12. Equation 12 is adjusted below to show the selection:

$$e[k] = |Y_{1V}[k]|^2 - H(|Y^B_{1V}[k]|, t) \quad (12a)$$

It is important to realize that $Y^B_{1V}$, $Y^B_{2V}$, $Y^B_{1H}$, $Y^B_{2H}$ are complex and that the first stage of the algorithm only provides an initial estimation of the channel because of the noisy error. Even if the filter solution is perfect, the error e[k] is not equal to zero in the steady state.

Once the first stage has been completed, the second stage (tracking) which uses a decision directed least means square (LMS) algorithm minimizes the error variation (i.e. to achieve MMSE-minimum means square error)

A decision is made with regard to $Y^B_{1V}$ The decided $Y^B_{1V}[k]$ should give the least possible error e[k]. For the n+1 iteration $$\underline{C}_{V1V1}^{n+1} = \underline{C}_{V1V1}^{n} - \mu \underline{r}_{1V}^{*}[k]e[k] \quad (13)$$

$$e[k] = Y^B_{1V}[k] - \text{decided}(Y^B_{1V}[k]) \quad (14)$$

Similarly, all other coefficients are calculated.

It should be evident that the process for determining the coefficients described above is just one of the many possible algorithms to distinguish (differentiate) between the signals. As long as the geometry of the system allows distinguishable signals, other beam forming algorithms can be used to recover the transmitted signals.

Beam forming can be performed as described above or using any suitable hardware and/or software. Beam forming can be performed using a fixed beam forming device or using adaptive signal processing.

Figure 12:
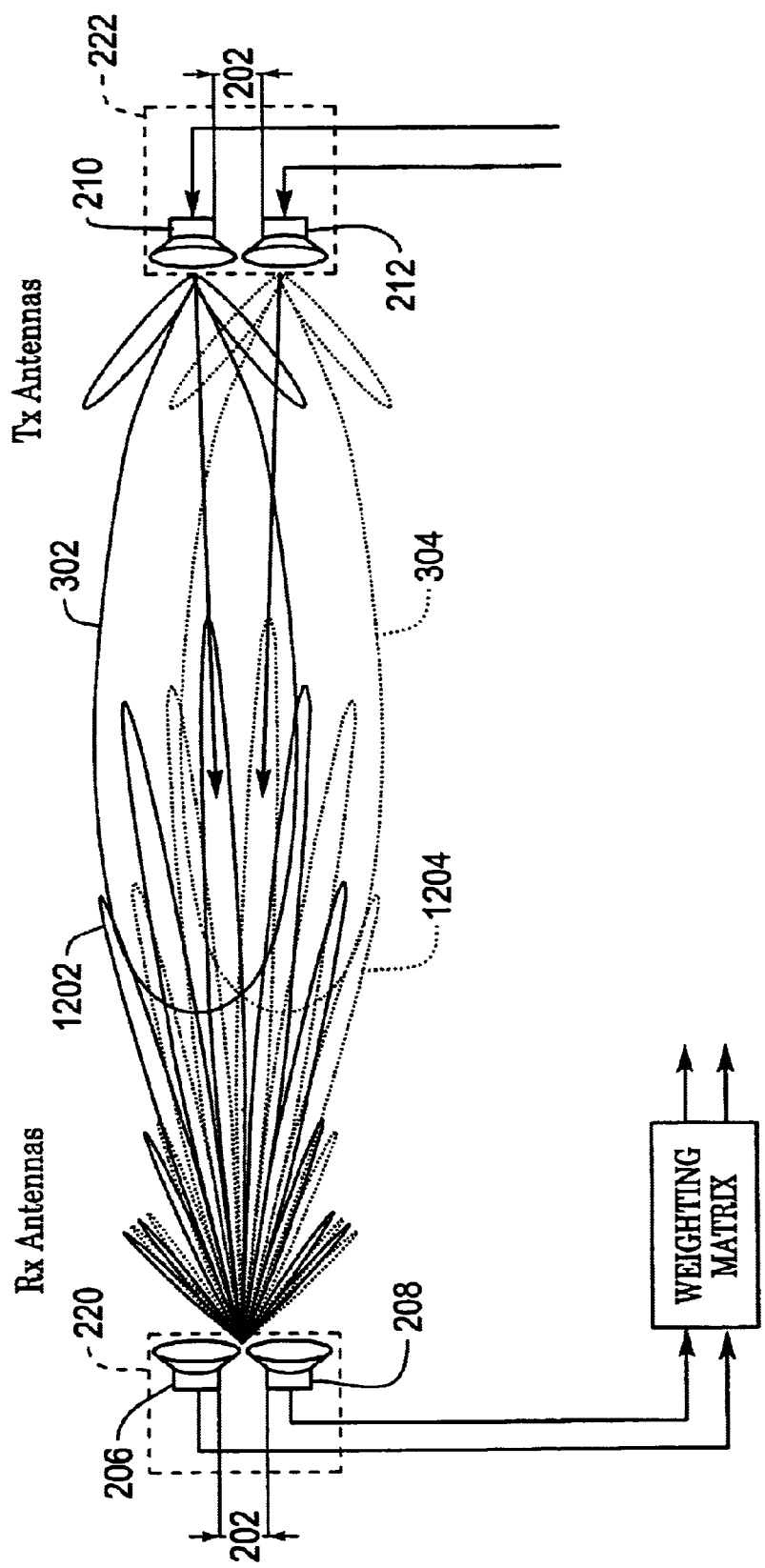
FIG. 12 graphically illustrates the beam forming, according to a preferred embodiment of the present invention.

Beam forming unit 512 using the procedure described above or any other suitable procedure removes as much as possible of the mutual correlation (interferences) between links 214 and 216. Refer to FIG. 12. Graphically, beam forming unit 512 generates array beams 1202 and 1204 with smaller width than antenna beamwidths 302 and 304. The array factor spatial responses 1202 and 1204 may have multiple maximums that are known as grating lobes. Each lobe has smaller width than the individual receiving antenna beam width, Beam forming unit 512, which is preferably digital adaptively steers at least one of the maximums of 1202 or 1204 towards the desired transmitting antenna 210 or 212 at the far site 222 and at least one of the minimums of 1204 or 1202 towards the other antenna 210 or 212. This steering ensures signal separation and independent links 214 and 216, thereby also allowing a linear increase in capacity.

It will also be understood that at least part of the system according to the invention may be a suitably programmed computer. Likewise, the invention contemplates a computer program being readable by a computer for executing one or more methods of the invention. The invention further contemplates a machine-readable memory tangibly embodying a program of instructions executable by the machine for executing one or more methods of the invention.

While the invention has been described with respect to a limited number of embodiments, it will be appreciated that many variations, modifications and other applications of the invention may be made.

What is claimed is:

1. A method for performing beam forming on signals which include symbols encoded by quadrature amplitude modulation, comprising:

providing a first statistical value derived from a constellation which includes all possible symbols;

providing at least two other statistical values derived from at least two subsets of said constellation;

for a first plurality of iterations, updating filter coefficients using said first statistical value; and for a second plurality of iterations, following said first plurality of iterations, updating said filter coefficients using said at least two other statistical values, wherein said updating using said at least two other statistical values includes for each iteration, deciding which of said at least two other statistical values to use.

2. The method of claim 1 further comprising:

following said second plurality of iterations, performing tracking using decided estimates of transmitted symbols.

3. A beam forming system for performing beam forming on signals which include symbols encoded by quadrature amplitude modulation, comprising:

a first statistical unit for providing a first statistical value derived from a constellation which includes all possible symbols;

at least two other statistical units for providing at least two other statistical values derived from at least two subsets of said constellation;

a first plurality of iterators for providing a first plurality of iterations, updating filter coefficients using said first statistical value; and a second plurality of iterators connected to said first plurality of iterators for providing a second plurality of iterations following said first plurality of iterations, updating said filter coefficients using said at least two other statistical values, wherein said updating using said at least two other statistical values includes for each iteration deciding which of said at least two other statistical values to use.

4. The system of claim 3 further comprising:

a tracking unit connected to said second plurality of iterators for performing tracking using decided estimates of transmitted symbols.

5. A program storage device readable by machine, tangibly embodying a program of instructions executable by the machine to perform beam forming on signals which include symbols encoded by quadrature amplitude modulation, comprising:

providing a first statistical value derived from a constellation which includes all possible symbols;

providing at least two other statistical values derived from at least two subsets of said constellation;

for a first plurality of iterations, updating filter coefficients using said first statistical value; and for a second plurality of iterations following said first plurality of iterations, updating said filter coefficients using said at least two other statistical values, wherein said updating using said at least two other statistical values includes for each iteration deciding which of said at least two other statistical values to use.

6. A computer program product comprising a computer useable medium having computer readable program code embodied therein for performing beam forming on signals which include symbols encoded by quadrature amplitude modulation, the computer program product comprising:

computer readable program code for causing the computer to provide a first statistical value derived from a constellation which includes all possible symbols;

computer readable program code for causing the computer to provide at least two other statistical values derived from at least two subsets of said constellation;

computer readable program code for causing the computer for a first plurality of iterations, to update filter coefficients using said first statistical value; and computer readable program code for causing the computer, for a second plurality of iterations following said first plurality of iterations, to update said filter coefficients using said at least two other statistical values, wherein said updating using said at least two other statistical values includes for each iteration deciding which of said at least two other statistical values to use.

7. A system for increasing the potential communication capacity between two sites within line of sight of one another, comprising:

a plurality of point to point links between the two sites, said plurality of links including at least one beam forming system as defined in claim 3 and a total of four antennas, wherein a geometrical configuration of said four antennas allows said at least one beam forming system to substantially differentiate between signals transmitted over said plurality of links, thereby increasing the potential communication capacity compared to a system with only two of said four antennas.

8. The system of claim 7, wherein said beam forming unit performs digital signal processing.

9. The system of claim 8, wherein said digital signal processing includes a decision direct least means square algorithm.

10. The system of claim 8 wherein said digital signal processing includes a blind algorithm.

11. The system of claim 7 wherein said plurality of links further include two coherent receivers for each of at least one of the two sites, said receivers fed by antennas at said at least one of the two sites.

12. The system of claim 11, further comprising a single local oscillator for maintaining coherency between said receivers at each of said at least one of the two sites.

13. The system of claim 7, wherein at least part of said plurality of links operate on dual polarization.

14. The system of claim 7, wherein a distance between two of said four antennas at each of the two sites is equivalent.

15. The system of claim 7, wherein a distance between two of said four antennas on at least one of the two sites is less than the smallest beamwidth of an antenna transmitting from an opposite site.

16. The system of claim 7, wherein said geographical configuration is defined by a link distance, a distance of a base line between two of said four antennas at each of the two sites, and two angles, said two angles being between a direction of signal travel between the two sites and said base line at each of the two sites.

17. The system of claim 16, wherein said geographical configuration is in accordance with $$\text{base line distance} \cong \sqrt{\frac{c \cdot (\text{link distance}) \cdot (\alpha - \beta)}{2\pi f \sin(\theta_1)\sin(\theta_2)}}.$$

18. The system of claim 7, wherein said beam forming unit substantially differentiates between signals because said geographical configuration conforms to a suitable value for a function of signal electrical phase differences.

19. The method of claim 18, wherein said function of electrical phase difference is a difference in two electrical phase differences, with a first electrical phase difference being the difference in phase of a signal transmitted by a first of said four antennas at a first of the two sites as received by a fourth of said four antennas at a second of the two sites and as received by a third of said four antennas at a second of the two sites, and a second electrical phase difference being the difference in phase of a signal transmitted by a second of said four antennas at a first of the two sites as received by said fourth antenna and as received by said third antenna.

20. A method for increasing the potential communication capacity between two sites within line of sight of one another, comprising:

providing a total of four antennas at the two sites;

selecting a range of values for a function of electrical phase difference for signals to be transmitted between said antennas; and conforming a geometrical configuration of said antennas to a value within said range, wherein said range allows substantial differentiation of transmitted signals by performing beam forming as defined in claim 1 and therefore giving rise to an increase in potential capacity compared to a method providing only two of said four antennas.

21. The method of claim 20, wherein said function of electrical phase difference is a difference in two electrical phase differences, with a first electrical phase difference being the difference in phase of a signal transmitted by a first of said four antennas at a first of the two sites as received by a fourth of said four antennas at a second of the two sites and as received by a third of said four antennas at a second of the two sites, and a second electrical phase difference being the difference in phase of a signal transmitted by a second of said four antennas at a first of the two sites as received by said fourth antenna and as received by said third antenna.

22. The method of claim 20, wherein said range specifically excludes $2n\pi$, where $n \in (0,1,2,\ldots)$.

23. The method of claim 20, wherein said range includes $(2n+1)\pi$, where $n \in (0, 1, 2, \ldots)$.

24. The method of claim 20, wherein said geometrical configuration is in accordance with:

$$\text{base line distance} \cong \sqrt{\frac{c \cdot (\text{link distance}) \cdot (\alpha - \beta)}{2\pi f \sin(\theta_1)\sin(\theta_2)}}.$$

25. A method for increasing the communication capacity between two sites within line of sight of one another, comprising:

providing two antennas at one site of the two sites, wherein said two antennas at said one site and two antennas at a second site of the two sites have a geometrical configuration which allows substantial differentiation of transmitted signals; and transmitting signals from each of said two antennas at said one site to each of said two antennas at said second site, performing beam forming as defined in claim 1, allowing differentiation between the transmitted signals, thereby increasing the capacity compared to a method providing only one of said two antennas at said one site.

26. The method of claim 25, wherein said transmitting includes illuminating each of said two antennas at said second site with the main lobes of at least one of said two antennas at said one site.

27. The method of claim 25, wherein said substantial differentiation between signals is allowed because said geographical configuration conforms to a suitable value for a function of signal electrical phase differences.

28. The method of claim 27, wherein said geometrical configuration is in accordance with:

$$\text{base line distance} \cong \sqrt{\frac{c \cdot (\text{link distance}) \cdot (\alpha - \beta)}{2\pi f \sin(\theta_1)\sin(\theta_2)}}.$$

29. The method of claim 27, wherein said value is $(2n+1)\pi \pm 10\%$, where $n \in (0, 1, 2, \ldots)$.

30. A method for increasing the communication capacity between two sites within line of site of one another, comprising:
  providing two antennas at one site of the two sites, wherein said two antennas at said one site and two antennas at a second site of the two sites have a geometrical configuration which allows substantial differentiation of signals;
  each of said two antennas at said one site receiving signals from each of said two antennas at said second site; and
  performing beam forming as defined in claim 1 to differentiate between signals originating from each of said two antennas at said second site, thereby increasing the capacity compared to a method providing only one of said two antennas at said one site.

31. The method of claim 30, wherein performing beam forming includes for each of said two antennas at said one site generating multiple grating lobes and adaptively steering at least one lobe toward a desired one of said two antennas at said second site, and at least one minimum towards another of said two antennas at said second site.

32. The method of claim 30, wherein performing beam forming includes solving filter coefficients using a decision directed least means square algorithm.

33. The method of claim 30, wherein performing beam forming includes solving filter coefficients using a blind algorithm.

34. The method of claim 30, wherein performing beam forming relies on said geographical configuration conforming with a suitable value for a function of signal electrical phase differences.

35. The method of claim 34, wherein said geometrical configuration is in accordance with:

$$\text{base line distance} \cong \sqrt{\frac{c \cdot (\text{link distance}) \cdot (\alpha - \beta)}{2\pi f \sin(\theta_1)\sin(\theta_2)}}.$$

36. The method of claim 34, wherein said value is $(2n+1)\pi \pm 10\%$, where $n \in (0, 1, 2, \ldots)$.

37. A system for increasing the potential capacity between two sites within line of sight of one another, comprising:
  at least one beam forming system as defined in claim 3 at a first of the two sites;
  two antennas at said first site, wherein said two antennas at said first site and two antennas at a second of the two sites have a geometrical configuration which allows said at least one beam forming system to substantial differentiate between signals received by said first site, thereby increasing potential capacity compared to a system with only one antenna at said first site.

38. A system for increasing the potential capacity between two sites within line of sight of one another, comprising:
  at least one beam forming system as defined in claim 3 at a first of the two sites;
  two antennas at said first site, wherein said two antennas at said first site and two antennas at a second of the two sites have a geometrical configuration which allows said at least one beam forming unit to substantial differentiate between signals received by said first site, thereby increasing potential capacity compared to a system with only one antenna at said first site;
  said geometrical configuration being according to:

$$\text{base line distance} \cong \sqrt{\frac{c \cdot (\text{link distance}) \cdot (\alpha - \beta)}{2\pi f \sin(\theta_1)\sin(\theta_2)}}$$

wherein $2n\pi < (\alpha - \beta) < (2n+2)\pi$, where $n \in (0, 1, 2, \ldots)$.

39. A method for increasing the communication capacity between two sites within line of site of one another, comprising:
  providing two antennas at one site of the two sites, wherein said two antennas at said one site and two antennas at a second site of the two sites have a geometrical configuration which allows substantial differentiation of signals;
  each of said two antennas at said one site receiving signals from each of said two antennas at said second site; and
  performing beam forming as defined in claim 1 to differentiate between signals originating from each of said two antennas at said second site, thereby increasing the capacity compared to a method providing only one of said two antennas at said one site;
  wherein said geometrical configuration is according to:

$$\text{base line distance} \cong \sqrt{\frac{c \cdot (\text{link distance}) \cdot (\alpha - \beta)}{2\pi f \sin(\theta_1)\sin(\theta_2)}}$$

and $2n\pi < (\alpha - \beta) < (2n+2)\pi$, where $n \in (0, 1, 2, \ldots)$.

* * * * *